US008703268B2

(12) United States Patent
Henry et al.

(10) Patent No.: US 8,703,268 B2
(45) Date of Patent: Apr. 22, 2014

(54) MORPHING PANEL STRUCTURE

(75) Inventors: Christopher P. Henry, Thousand Oaks, CA (US); Sloan P. Smith, Calabasas, CA (US); Andrew C. Keefe, Encino, CA (US)

(73) Assignee: The Boeing Company, Chicago, IL (US)

( * ) Notice: Subject to any disclaimer, the term of this patent is extended or adjusted under 35 U.S.C. 154(b) by 1084 days.

(21) Appl. No.: 12/698,285

(22) Filed: Feb. 2, 2010

(65) Prior Publication Data

US 2011/0114791 A1 May 19, 2011

Related U.S. Application Data

(60) Provisional application No. 61/260,938, filed on Nov. 13, 2009.

(51) Int. Cl.
*B64C 3/38* (2006.01)
*B64C 3/54* (2006.01)

(52) U.S. Cl.
USPC ............ 428/116; 244/46; 244/99.8; 244/200; 244/201; 29/897.2

(58) Field of Classification Search
USPC .............. 428/116–118, 137, 172, 178, 318.4, 428/373; 244/133, 99.2, 123.12, 123.6, 244/129.1, 99.8, 134 A, 123.13; 49/21, 31, 49/139; 52/1, 222; 29/897.2; 310/331
See application file for complete search history.

(56) References Cited

U.S. PATENT DOCUMENTS

| 2,427,853 | A  | * | 9/1947  | Goodlett ..................... 244/123.2 |
| 7,192,145 | B2 | * | 3/2007  | Ealey ............................. 359/849 |
| 7,284,786 | B2 |   | 10/2007 | Browne et al. |
| 7,901,524 | B1 |   | 3/2011  | McKnight et al. |
| 8,272,214 | B2 |   | 9/2012  | Mankame et al. |
| 8,332,053 | B1 |   | 12/2012 | Patterson et al. |
| 8,354,170 | B1 |   | 1/2013  | Henry et al. |
| 8,390,305 | B2 |   | 3/2013  | Herrera et al. |
| 8,409,691 | B1 |   | 4/2013  | Henry et al. |
| 8,475,074 | B1 |   | 7/2013  | Henry |
| 8,476,564 | B2 |   | 7/2013  | Henry et al. |
| 2003/0173460 | A1 | * | 9/2003 | Chapman, Jr. ................ 244/123 |
| 2006/0145030 | A1 |   | 7/2006 | Cowan et al. |
| 2006/0163431 | A1 | * | 7/2006 | Dittrich ......................... 244/126 |
| 2006/0192465 | A1 |   | 8/2006 | Kornbluh et al. |
| 2007/0138341 | A1 |   | 6/2007 | Joshi et al. |
| 2008/0035788 | A1 |   | 2/2008 | Kothera et al. |

FOREIGN PATENT DOCUMENTS

DE          19709917 C1     4/1998

OTHER PUBLICATIONS

Misra et al., "Adaptive Structure Design Employing Shape Memory Actuators", Apr. 1993, AGARD Conference Proceedings 531, North Atlantic Treaty Organization, pp. 15-1 to 15-6.*

(Continued)

*Primary Examiner* — David Sample
*Assistant Examiner* — Nicholas W Jordan
(74) *Attorney, Agent, or Firm* — Hanley, Flight & Zimmerman, LLC

(57) ABSTRACT

A panel structure includes a composite facesheet and a stiffening core having a plurality of core members in an intersecting web configuration provided on the composite facesheet.

24 Claims, 7 Drawing Sheets

(56) References Cited

OTHER PUBLICATIONS

Olympio and Gandhi, "Zero-v Cellular Honeycomb Flexible Skins for One-Dimensional Wing Morphing", Apr. 23-26, 2007, American Institute of Aeronautics and Astronautics, Inc., 48th AIAA/ASME/ASCE/AHS/ASC Structures, Structural Dynamics, and Materials Conference, pp. 1-28.*

Li, S., Amir Lotfi, Ying Shan, K.W. Wang, Christopher D. Rahn, Charles E. Bakis, "A variable transverse stiffness sandwich structure suing fluidic flexible matrix composite (F2MC)," Proc. of SPIE vol. 6928, (2008).

Michael Philen, Ying Shan, C.E. Bakis, K.W. Wang, C.D. Rahn, "Variable Stiffness Adaptive Structures utilizing Hydraulically Pressurized Flexible Matrix Composites with Valve Control," $47^{th}$ AIAA/ASME/ASCE/AHS/ASC Structures, Structural Dynamics, and Materials Conference, AIAA 2006-2134.

Michael Philen, Ying Shan, K.W. Wang, C.E. Bakis, C.D. Rahn, "Fluidic Flexible Matrix Composites for the Tailoring of Variable Stiffness Adaptive Structures," $48^{th}$ AIAA/ASME/ASCE/AHS/ASC Structures, Structural Dynamics, and Materials Conference, AIAA 2007-1703.

Anderson, E., Bales, G., White, E., "Application of Smart material—Hydraulic Actuators," Proceedings of SPIE vol. 5054 (2003).

Tondu, B., and P. Lopez, "Modeling and Control of McKibben Artificial Muscle Robot Actuators," *IEEE Control Systems Magazine*, Apr. 2000, pp. 15-38.

Y. Shan et al. *I* Composites Science and Technology 66 (2006) 3053-3063.

Chou, C-P., and B. Hannaford, "Measurement and modeling of McKibben pneumatic artificial muscles," *IEEE Trans. Robotic Automat*, vol. 12, No. 1, pp. 90-102, 1996.

* cited by examiner

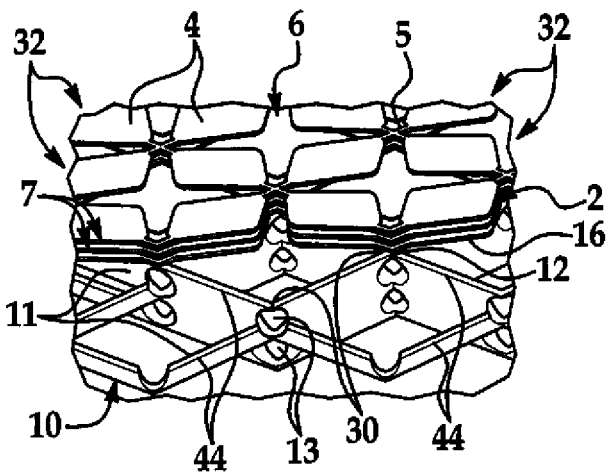

FIG. 5

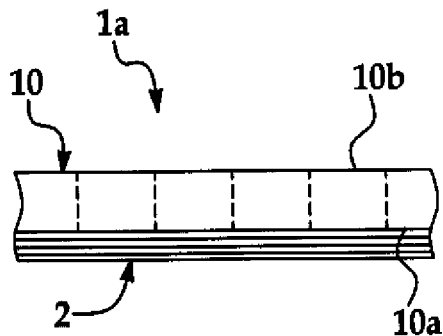

FIG. 6

| COMPOSITE FACESHEET WITH REINFORCING LAYERS EACH HAVING REINFORCING ELEMENTS AND ELASTOMERIC MATRIX LAYERS BETWEEN REINFORCING LAYERS |
| --- |
| STIFFENING CORE WITH WEB CONFIGURATION OF CORE MEMBERS |
| COMPOSITE FACESHEET WITH LAMINATED CONSTRUCTION OF REINFORCING LAYERS EACH HAVING REINFORCING ELEMENTS AND ELASTOMERIC MATRIX LAYERS BETWEEN REINFORCING LAYERS |

FIG. 6A

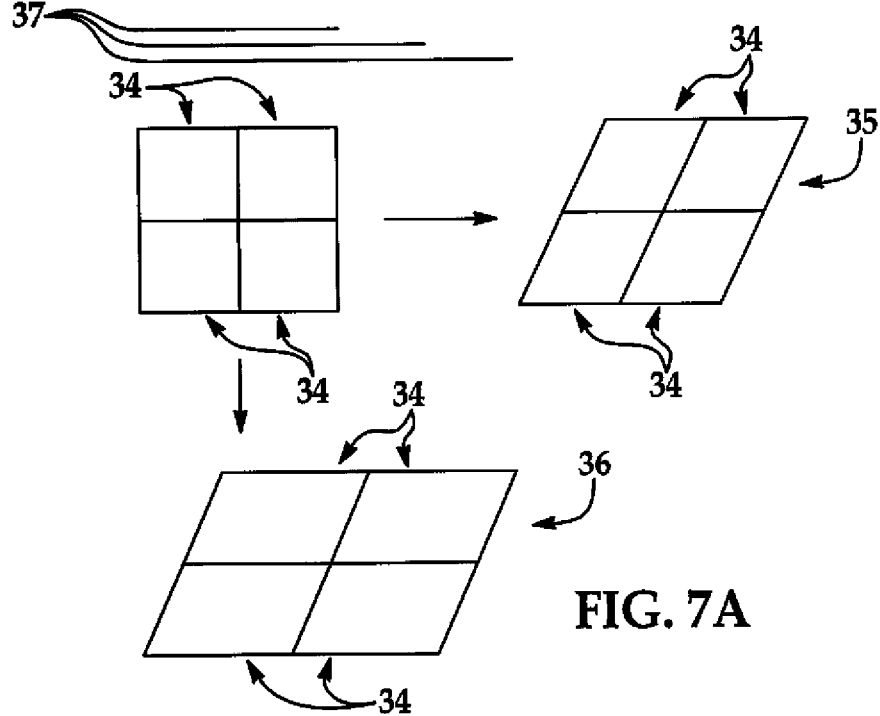

MORPHING PANEL STRUCTURE

CROSS-REFERENCE TO RELATED APPLICATIONS

This application claims the benefit of and incorporates by reference in its entirety U.S. provisional application No. 61/260,938, filed Nov. 13, 2009 and entitled "Morphing Sandwich Panel Architectures for Aircraft Applications".

TECHNICAL FIELD

The disclosure relates to morphing panel structures which are suitable for aerodynamic applications. More particularly, the disclosure relates to a core-based morphing panel structure which is resistant to out-of-plane deformation without compromising in-plane deformation capability.

BACKGROUND

Morphing panel structures may be useful in aerodynamic applications in which large pressure and temperature gradients or loads may be applied to an airfoil or other surface. The aerodynamic functionality of morphing panel structures may require a delicate balance between the flexibility and the structural support capabilities of the structures. Conventional panel structures in aerospace and other applications may be inordinately resistant to in-plane deformation. Therefore, it may be desirable that morphing panel structures which are suitable for aerospace applications be resistant to out-of-plane bending or flexing deformation while remaining amenable to in-plane deformation.

SUMMARY

The disclosure is generally directed to a panel structure which is resistant to out-of-plane bending or flexing deformation while remaining amenable to in-plane deformation. The panel structure may be amenable to aerospace and other applications. An illustrative embodiment of the panel structure includes a composite facesheet and a stiffening core having a plurality of core members in an intersecting web configuration provided on the composite facesheet.

In some embodiments, the panel structure may include a composite facesheet including a plurality of reinforcing layers of reinforcing elements and core webbing attaching the reinforcing elements to each other and a plurality of elastomeric matrix layers laminated with the reinforcing layers in the composite facesheet. A stiffening core may be provided on the composite facesheet. The stiffening core may include a web configuration of intersecting core members and a plurality of core spaces defined by and between the core members.

The disclosure is further generally directed to a method of fabricating a panel structure. An illustrative embodiment of the method includes providing a composite facesheet, providing a stiffening core and attaching the stiffening core to the composite facesheet.

In some embodiments, the panel structure may include a first composite facesheet including a first plurality of reinforcing layers of reinforcing elements, core webbing attaching the reinforcing elements to each other and a first plurality of sheet spaces defined by and between the reinforcing elements. A first plurality of elastomeric matrix layers may be laminated with the first plurality of reinforcing layers in the first composite facesheet. A stiffening core may be provided on the first composite facesheet and may include a web configuration of intersecting core members and a plurality of core spaces defined by and between the core members. A plurality of openings may be provided in the core members. A second composite facesheet may be provided on the stiffening core and may include a second plurality of reinforcing layers of reinforcing elements and core webbing attaching the reinforcing elements to each other. A second plurality of sheet spaces may be defined by and between the reinforcing elements. A second plurality of elastomeric matrix layers may be laminated with the second plurality of reinforcing layers in the second composite facesheet.

The disclosure is generally further directed to a method of changing shape of a structure to be morphed. An illustrative embodiment of the method includes providing a morphing panel structure, providing actuators in the morphing panel structure, providing a structure to be morphed, incorporating the morphing panel structure into the structure to be morphed and changing shape of the structure to be morphed by operating the actuators in the morphing panel structure.

BRIEF DESCRIPTION OF THE ILLUSTRATIONS

FIG. 5 is an illustration of a perspective view, partially in section, of an embodiment of the morphing panel structure, with the facesheet provided on the stiffening core.

FIG. 6 is an illustration of a sectional view of a portion of an alternative embodiment of the morphing panel structure.

FIG. 6A is an illustration of a functional block diagram of an embodiment of the morphing panel structure.

FIG. 7A is an illustration of a schematic diagram which illustrates rhomboidal and parallelogram in-plane deformation shapes of an embodiment of the morphing panel structure.

DETAILED DESCRIPTION

Figures 1, 2:
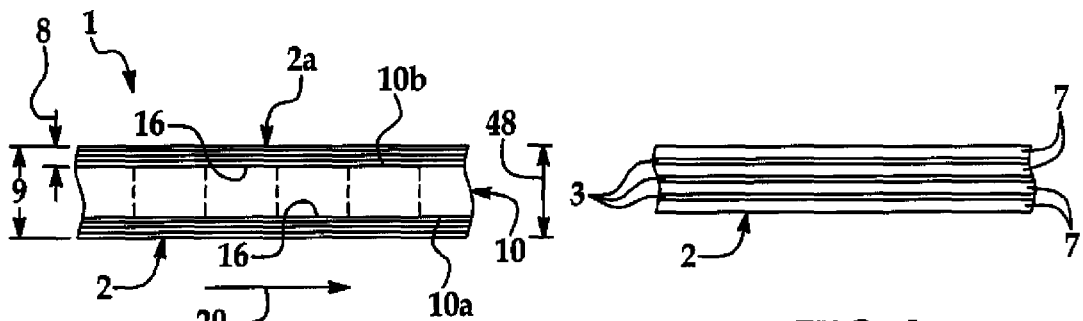
FIG. 1 is an illustration of a sectional view of a portion of an illustrative embodiment of the morphing panel structure.
FIG. 2 is an illustration of a sectional view of a portion of a multi-layered composite facesheet of an embodiment of the morphing panel structure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The disclosure is generally directed to a core-based morphing panel structure which is resistant to out-of-plane deformation without compromising in-plane deformation capability. In some embodiments, the panel structure may include a spacing or stiffening core which is interposed between elastomeric matrix composite-based facesheets. In some embodiments, the core may be provided on one elastomeric matrix composite-based facesheet. A stiffening geometry (Z-, T-, J-, hat or I-beam-like stringer, for example and without limitation) may be included into the core to provide stiffness to the core. The panel structure may be applicable to morphing aerospace applications or any other morphing applications in which optimization of stiffness or rigidity and in-plane deformation capability are desired.

In some embodiments, the degree of freedom of the core 10 along the x axis 24 and the y axis 25 (FIG. 4) may be different than the degree of freedom along the x axis 26 and the y axis 27 (FIG. 3) in the composite facesheet 2. The core 10 and composite facesheet 2 may be attached in certain nodal locations 30 (FIG. 5) that permit a repeating pseudo-planar mechanism 32 to be formed.

The design of the morphing panel structure 1 may facilitate a substantial increase in bending rigidity to resist aerodynamic pressure and resist buckling while only adding minimal weight. The core 10 design, in conjunction with the composite facesheet 2, may permit the in-plane degree of freedom 40 (FIG. 4D) which is necessary to achieve the desired morphing deformation 50, 50a (FIG. 7) of a wing (not shown) or other structure (not shown) using minimal control energy. The core 2 may be porous to permit room for sensor, electronics and actuator 42 (FIG. 4) insertion and integration.

Referring to FIG. 7A, various illustrative embodiments of the morphing panel structure with reversible shearing deformation designs are illustrated and described herein below. However, it is anticipated that other panel structure designs that permit in-plane deformation are possible. As shown in FIG. 7A, in plane, the basic translational repeat 34 (the repeating in-plane distortion shape of the panel structure 1 during morphing of the panel structure 1) may be a rhombus 35 in the various embodiments, although for shearing deformation, the basic translational repeat unit 34 may be more generalized to a parallelogram 36. This same basic translational repeat 34 may be repeated at different length scales 37, or scales along the X-axis 26 and/or the y-axis 27, through the thickness 8 (FIG. 1) of the composite facesheet 2. The embodiments of the morphing panel structure 1 may have a fixed length scale/size of the rhombus-shaped basic translational repeat unit 34 through the thickness 9 (FIG. 1) of the structure 1.

Referring to FIGS. 1-6A, an illustrative embodiment of the morphing panel structure, hereinafter structure, is generally indicated by reference numeral 1. As shown in FIG. 1, the structure 1 may include a spacing or stiffening core 10 having first and second core surfaces 10a and 10b, respectively. In some embodiments, a first composite facesheet 2 may be provided on the first core surface 10a. A second composite facesheet 2a may optionally be provided on the second core surface 10b of the core 10 such that the structure 1 forms a sandwich configuration. As shown in FIG. 6, in some embodiments the structure 1a may include a composite facesheet 2 which is provided on the first core surface 10a of the core 10. A composite facesheet 2a (FIG. 1) may be omitted from the second core surface 10b of the core 10 in the structure 1a.

Figure 3:
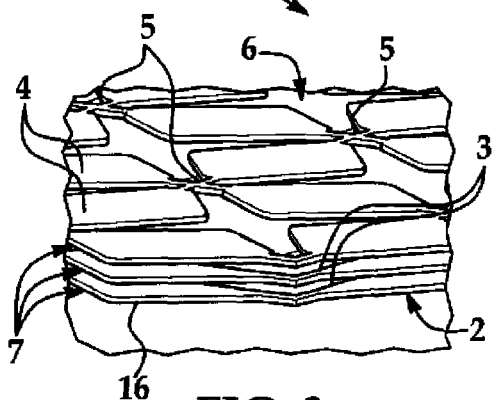
FIG. 3 is an illustration of a perspective view, partially in section, of the composite facesheet of an embodiment of the morphing panel structure.

As shown in FIGS. 2 and 3, each composite facesheet 2 of the structure 1 may include elastomeric matrix layers 3. Multiple reinforcing layers 7 of interconnected, repeating reinforcing elements 4 may alternate with the elastomeric matrix layers 3 in the composite facesheet 2. A core webbing 5 may connect the reinforcing elements 4 to each other in each reinforcing layer 7. Each reinforcing element 4 may have a generally rhomboid 35 (FIG. 7A) or parallelogram 36 (FIG. 7A) shape. Sheet spaces 6 may be defined by and between the adjacent reinforcing elements 4 in each reinforcing layer 7. The sheet spaces 6 may facilitate in-plane movement of the reinforcing elements 4 as deformation stresses are applied to the structure 1. In fabrication, the reinforcing elements 4 and the core webbing 5 may be formed from, without limitation, a structural alloy foil or a composite structural sheet material (not shown) or other suitable material that can be etched, laser or water jet cut, machined, stamped or the like. Each elastomeric matrix layer 3 may be an elastomeric matrix material that can be, without limitation, thermoformed; solvent cast; vacuum-assisted resin transfer molded; or the like.

Figure 4:
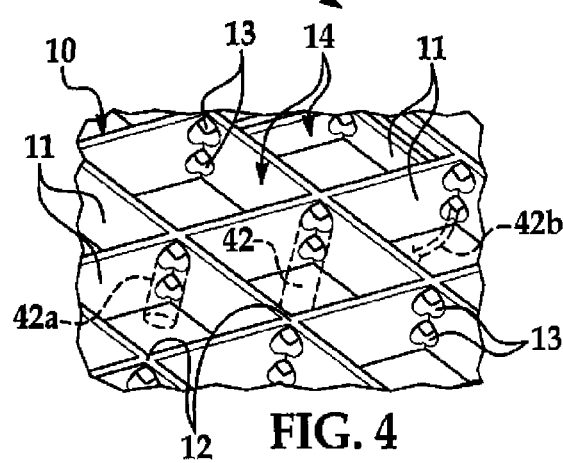
FIG. 4 is an illustration of a perspective view, partially in section, of a stiffening core of an embodiment of the morphing panel structure.
Figure 4A:
FIG. 4A is an illustration of a cross-section of a core member of a stiffening core with stacked layers forming each core member.
Figure 4B:
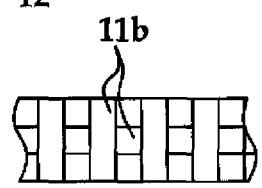
FIG. 4B is an illustration of a cross-section of a core member of a stiffening core with even weaves forming each core member.
Figure 4C:
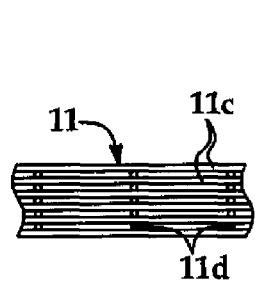
FIG. 4C is an illustration of a cross-section of a core member of a stiffening core with bonded strips forming each core member.
Figure 4D:
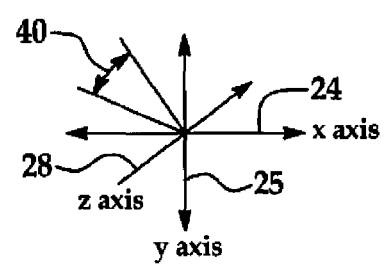
FIG. 4D is a diagram illustrating a compliant in-plane degree of freedom of an embodiment of the morphing panel structure.
Figure 4E:
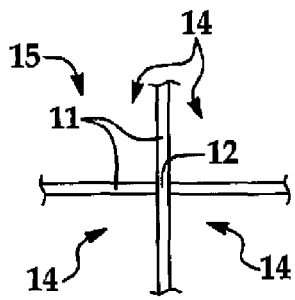
FIG. 4E is an illustration of a diagram in which core members of the stiffening core are constructed in a wine bottle configuration.

As shown in FIGS. 4-4D and 5, the core 10 of the structure 1 may include multiple core members 11 which may be a metallic or composite material, for example and without limitation. In some embodiments, the core 10 may be constructed in a web configuration in which the core members 11 intersect at core member junctions 12. Core spaces 14 may be defined by and between the core members 11. The core members 11 may be made with a series of stacked layers 11a (FIG. 4A) or even weaves 11b (FIG. 4B) or as a series of expanded strips 11c (FIG. 4C) that are bonded in narrow, periodic locations 11d along the strips 11c. As shown in FIG. 4E, in some embodiments, the core members 11 may be constructed as a "wine bottle partition" 15 (vertically interleaved strips 11). The core members 11 may be interlocked, adhered, welded, bonded, brazed and/or otherwise attached to each other at the core member junctions 12. Core spaces 14 may be defined between the intersecting core members 11.

In some embodiments of the structure 1, the core 10 may have the same compliant degree of freedom 40 (FIG. 4D) as the composite facesheet 2. In some embodiments, the core 10 may have a different and complementary degree of freedom 40 with respect to the core members 11, which provide shear displacements as well as enhanced stiffening functionality to the structure 1.

As shown in FIG. 4, in some embodiments, openings 13 may be provided in the core members 11 to facilitate insertion of actuators 42, sensors 42a and/or electrical wiring 42b, for example and without limitation, to provide a mechanical connection between the components 42 and the core 10. Actuators 42, which may be flexible, may be embedded into the core spaces 14 of the stiffening core 10 and attached to the core members 11 at the openings 13. After attachment of the actuators 42 or other components, the composite facesheets 2 may be attached to the core 10 as hereinafter described.

The composite facesheets 2 may be attached to the core 10 according to any suitable technique which is known to those skilled in the art. Each composite facesheet 2 may be attached to the core 10 in select regions 44 (FIG. 5) so as not to interfere with the planar shear degree of freedom 40 (FIG. 4D). The core 10 may be bonded, welded, brazed and/or otherwise attached to the inner surfaces 16 of each composite facesheet 2. In some embodiments, the core 10 may be welded to each composite facesheet 2 via tabs (not shown) or may alternatively be adhesively bonded to the composite facesheet 2. In some embodiments, the core 10 may penetrate into the composite facesheet 2 via an interpenetrating mechanical interlock (not shown) to distribute loading from the core 10 throughout the thickness of the composite facesheet 2.

The composite facesheets 2 and the core 10 may be sized in different ways depending on the particular application of the structure 1. In some embodiments, each composite facesheet 2 may have a thickness of about 0.001~0.005 inches. The core 10 may be a substantial fraction of the overall thickness of the structure 1, with a thickness of about 0.040~0.25 inches. Actuators (not shown) embedded in the core 10 may be about 0.02~0.10 inches in diameter. The overall thickness 9 (FIG. 1) of the structure 1 may be about 0.17 inch. The thickness 9 (for the moment of inertia calculation) and stiffness (which is a function of the geometric design) may determine the torsional rigidity of the structure 1. The thickness 9 may be scaled to meet the torsional rigidity requirements of the structure 1.

Figure 7:
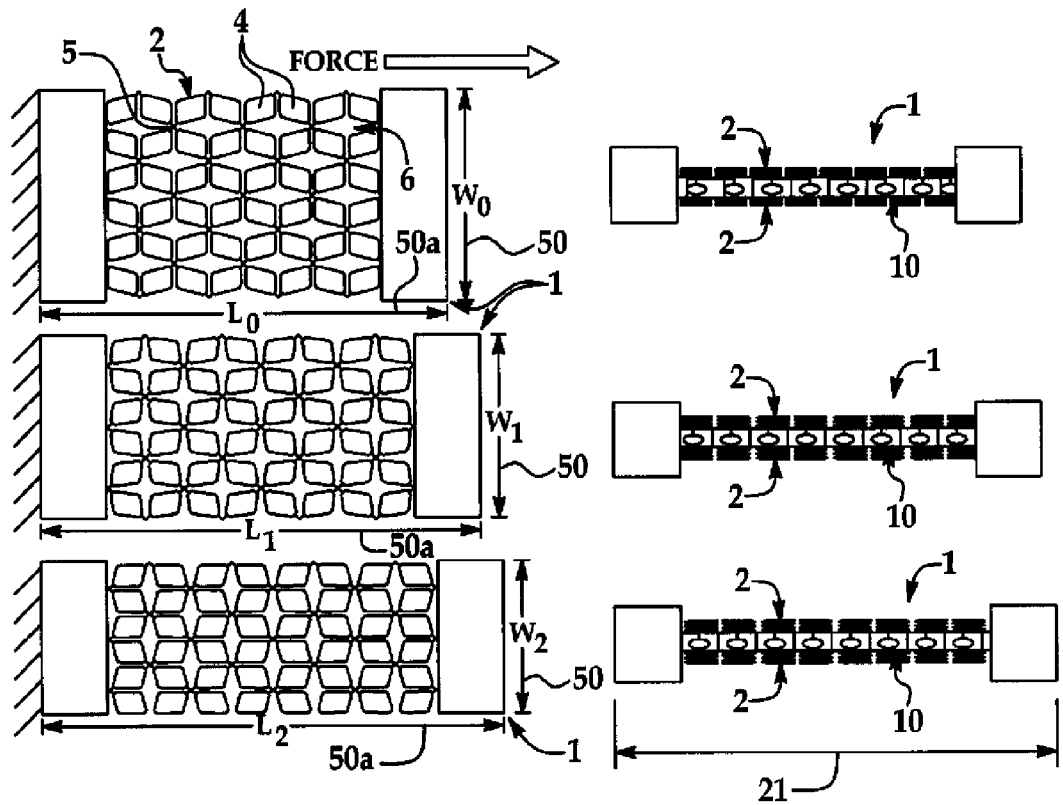
FIG. 7 is an illustration of a schematic top view which illustrates in-plane deformation capabilities of an embodiment of the morphing panel structure.

In some applications, the structure 1 may be used in the fabrication of aircraft skins on the wings 22 (FIG. 9) and/or other surfaces of an aircraft. The facesheet/core panel construction of the structure 1 may dramatically aid bending stiffness without compromising the designed in-plane degree of freedom/pliant direction 40 (FIG. 4D). The compliant in-plane degree of freedom 40 of the structure 1 may greatly reduce the actuation control energy which is needed to induce and hold morphing deformations of the aircraft wing 22 or other surface of which the structure 1 is a part. The compliance 1 may yield maximum performance (optimum compliance in the degree of freedom/pliant direction 40) when it is fixed along a direction 20 (FIG. 1) in which the structure 1 maintains a constant length 21 (FIG. 7). When subjected to shear deformation 46 (FIG. 10), the structure 1 may still retain the benefit of large, out-of-plane bending stiffness 48 (FIG. 1) in the other non-compliant directions 28 (FIG. 4D). The structure 1 may be amenable to a variety of other aerospace applications including but not limited to winglets, doors, resizable compartments and turbine inlet and outlet nozzles, horizontal stabilizer, control surfaces, vertical stabilizer as well as non-aerospace applications.

A block diagram of an illustrative embodiment of the morphing panel structure 1 is shown in FIG. 6A. The morphing panel structure 1 may include a stiffening core 10 with a web configuration of core members 11 (FIG. 4). A composite facesheet 2 with a laminated construction of reinforcing layers 7 (FIG. 3) each having reinforcing elements 4 (FIG. 3) and elastomeric matrix layers 3 (FIG. 2) may be provided on a first core surface 10a (FIG. 1) of the stiffening core 10. In some embodiments, a composite facesheet 2a with a laminated construction of reinforcing layers 7 (FIG. 3) each having reinforcing elements 4 (FIG. 3) and elastomeric matrix layers 3 (FIG. 2) may be provided on a second core surface 10b (FIG. 1) of the stiffening core 10.

Referring next to FIG. 7, in-plane deformation capabilities 50, 50a of an illustrative embodiment of the morphing panel structure 1 is shown. As the length "L" of the structure 1 increases in the longitudinal direction 50a, the width "W" of the structure 1 may decrease in the transverse direction 50, and vice-versa.

Figure 8:
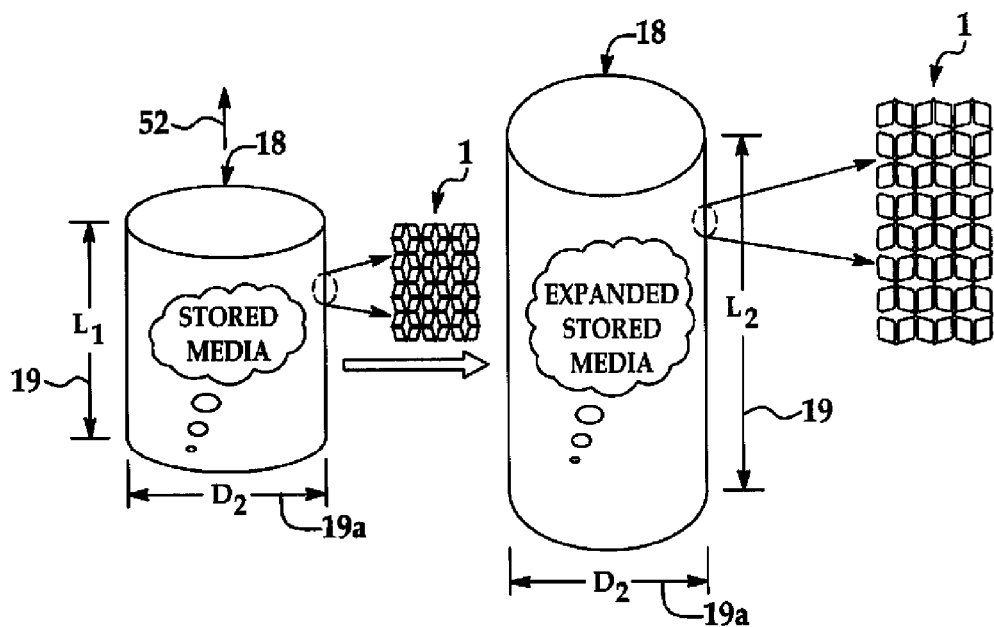
FIG. 8 is an illustration of a schematic perspective view of an expandable pressure vessel which incorporates an embodiment of the morphing panel structure.

Referring next to FIG. 8, an expandable pressure vessel 18 which incorporates an illustrative embodiment of the morphing panel structure 1 is shown. As the height 19 or length "L" of the structure 1 increases in the longitudinal direction 52, the diameter of the structure 1 may decrease, and vice-versa.

Figure 9:
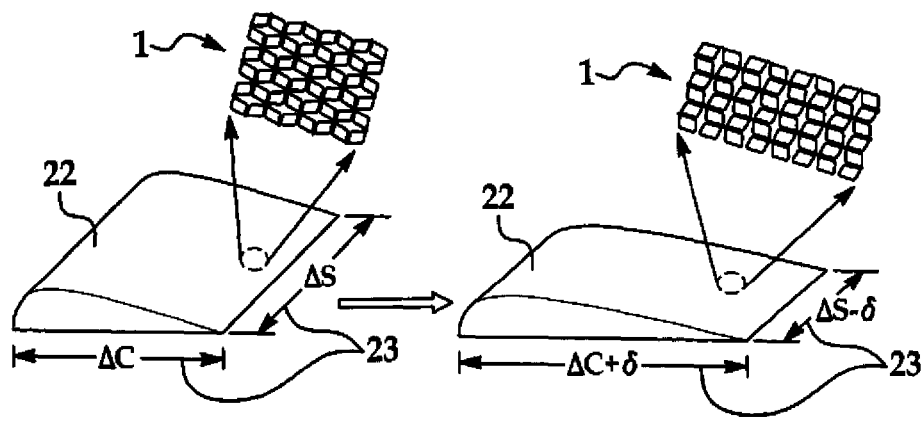
FIG. 9 is an illustration of a perspective view of a variable span wing which incorporates an embodiment of the morphing panel structure, more particularly illustrating changes in the chord and span of the wing.

Referring next to FIG. 9, a variable span wing 22 which incorporates an illustrative embodiment of the morphing panel structure 1 is shown. Changes in the chord ($\Delta C$) and changes in the span ($\Delta S$) of the wing 22 may be inversely related to each other. Accordingly, an increase in the chord ($\Delta C+\delta$) may correspond to a decrease in the span ($\Delta S-\delta$), and vice-versa.

Figure 10:
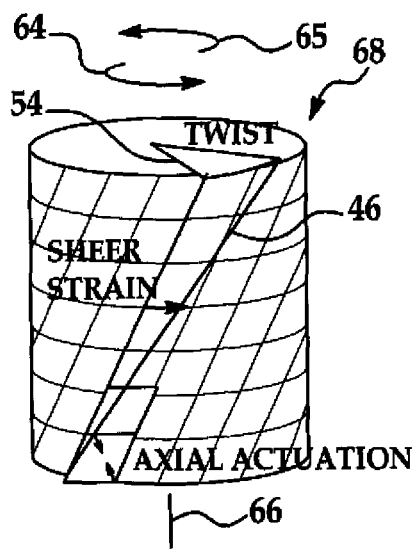
FIG. 10 is an illustration of a diagram which illustrates differential in-plane twisting deformation capability of an embodiment of the morphing panel structure.
Figure 11:
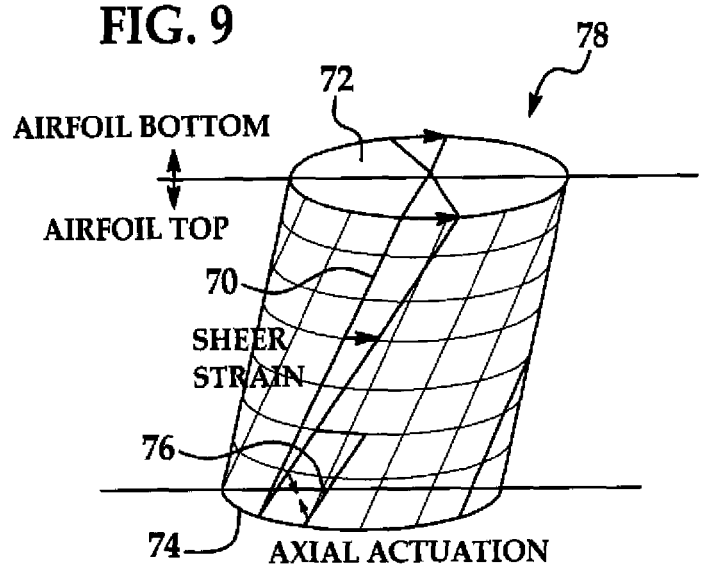
FIG. 11 is an illustration of a diagram which illustrates differential in-plane shear deformation capability of an embodiment of the morphing panel structure.

Referring next to FIGS. 10 and 11, in-plane deformation capabilities of an illustrative embodiment of the morphing panel structure 1 are shown. FIG. 10 illustrates differential in-plane global twisting deformation capability 54 of the morphing panel structure 1, with the compliant axes of the structure 1 oriented at a positive 64 (counterclockwise) and a negative 65 (clockwise) angle with respect to the span axis 66. The reversible sheer deformation design 46 may permit wing twisting 54 in a closed airfoil geometry 68 by differential deformation of the counterclockwise angle 64 with respect to the clockwise angle 65 around the entire closed geometry 68. This change in shape may permit a resultant twist 54 about the span axis 66 as shown in FIG. 10. FIG. 11 illustrates differential in-plane shear deformation capability 70 of the structure 1. When the differential deformation occurs symmetrically between the top 72 and bottom 74 of the structure 1, a sweep change 76 and a corresponding fractional change in chord and span may occur. Aspect ratio (chord/camber change or area change) in planform may be accomplished with the shearing deformation design 78 by having the differential deformation described above be mirror symmetric with respect to the area change plane.

Figure 12:
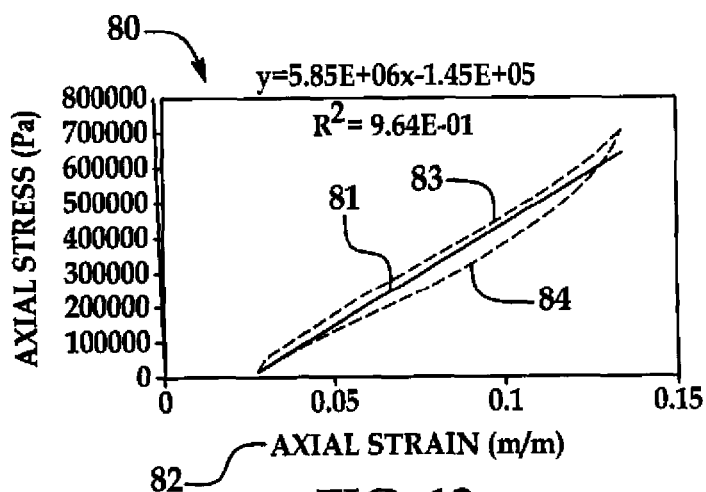
FIG. 12 is an illustration of a line graph which illustrates compliant stiffness of a composite facesheet which is suitable for fabrication of an embodiment of the morphing panel structure.

Referring next to FIG. 12, a line graph 80 which illustrates compliant stiffness 81 of a composite facesheet which is suitable for fabrication of an illustrative embodiment of the morphing panel structure 1 is shown. The structure 1 which includes a pair of facesheets 2 with a core 10 sandwiched between the facesheets 2 has been shown to have a 30 fold increase 90 in bending stiffness 83 as compared to the bending stiffness 84 of the facesheet 2 alone. However, although the bending stiffness 83 of the structure 1 is increased relative to that 84 of the facesheet 2, the axial strain 82 of the structure 1 is not compromised.

Figure 13:
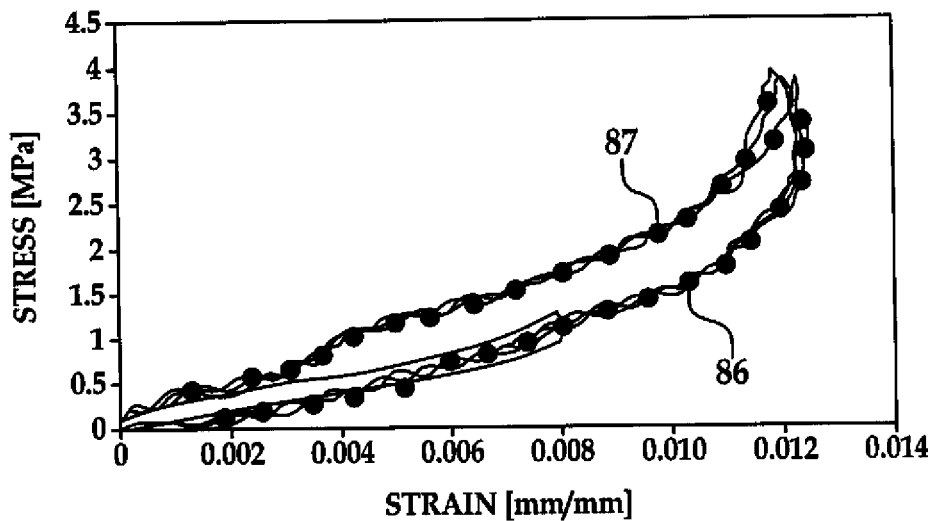
FIG. 13 is an illustration of a line graph which illustrates compliant stiffness of a composite facesheet relative to an embodiment of the morphing panel structure.

Referring next to FIG. 13, a line graph which illustrates compliant stiffness 86 of a composite facesheet 2 relative to the compliant stiffness 87 an illustrative embodiment of the morphing panel structure 1 is shown. In FIG. 13, the compliant stiffness 87 of the structure 1 is shown to display substantially the same low shear stiffness 86 as the facesheet 2 alone.

Figure 14:
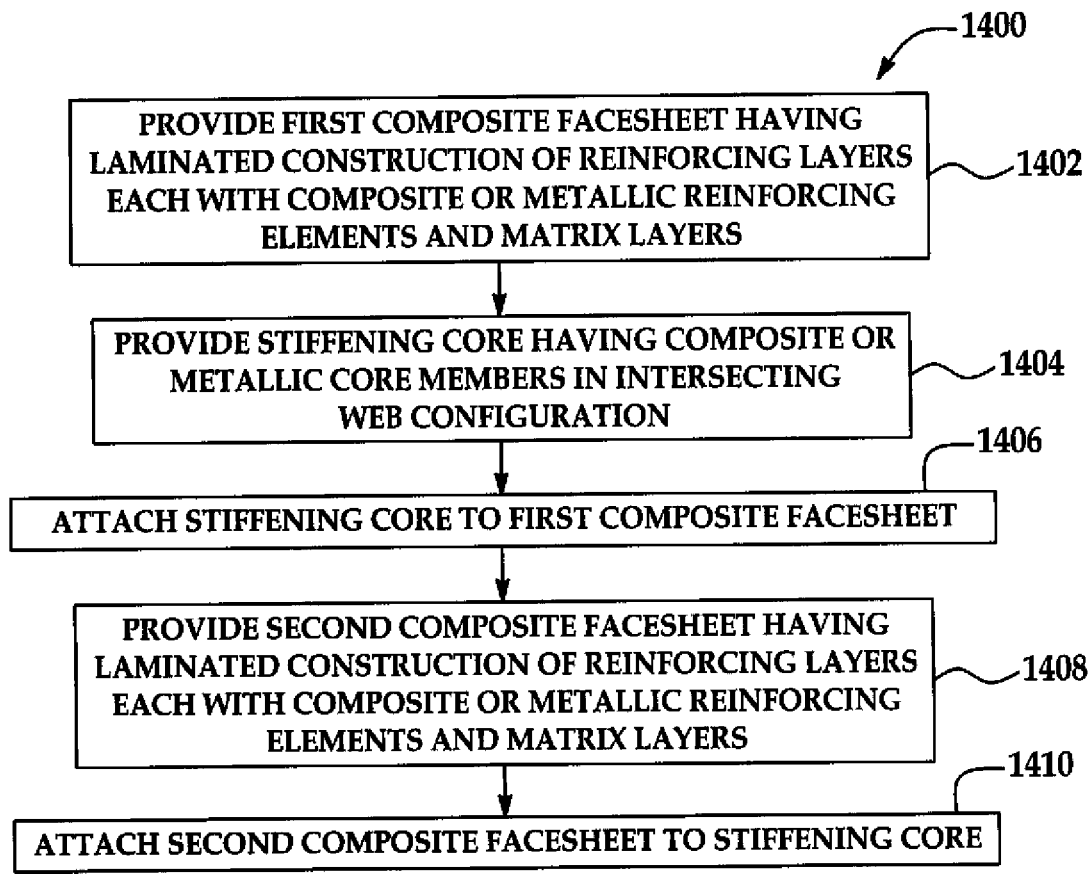
FIG. 14 is an illustration of a flow diagram of an embodiment of a method of fabricating a morphing sandwich structure.

Referring next to FIG. 14, a flow diagram 1400 of an illustrative embodiment of a method of fabricating a morphing sandwich structure is shown. In block 1402, a first composite facesheet may be provided. In some embodiments, the first composite facesheet may include a laminated construction of reinforcing layers each having a plurality of composite or metallic, for example and without limitation, reinforcing elements and elastomeric matrix layers between the reinforcing layers. In block 1404, a spacing or stiffening core may be provided. In some embodiments, the core may include a plurality of composite or metallic, for example and without limitation, core members in an intersecting web configuration. In block 1406, the stiffening core may be attached to the first composite facesheet. In block 1408, a second composite facesheet may be provided. In some embodiments, the second composite facesheet may include a laminated construction of reinforcing layers each having a plurality of composite or metallic, for example and without limitation, reinforcing elements and elastomeric matrix layers between the reinforcing layers. In block 1410, the second composite facesheet may be attached to the stiffening core.

Figure 15:
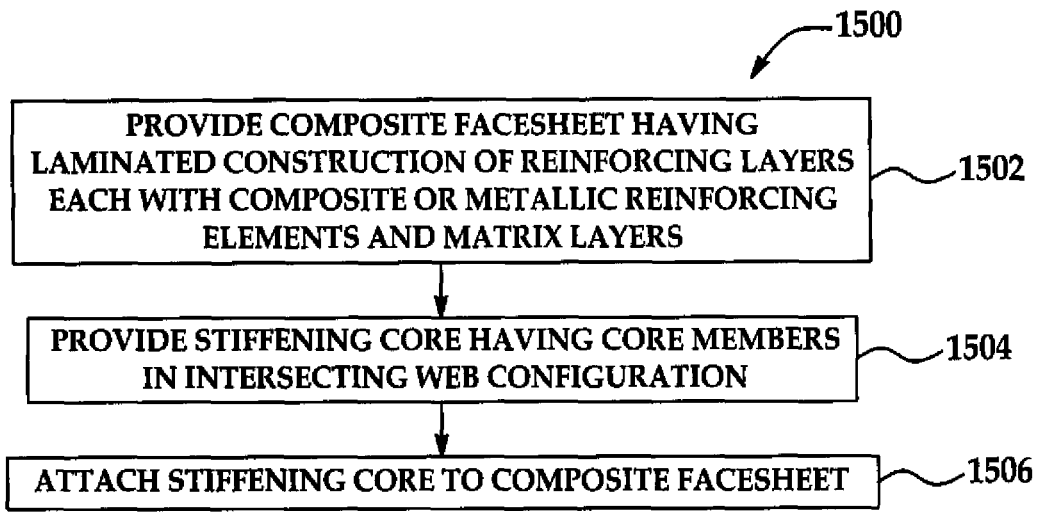
FIG. 15 is an illustration of a flow diagram of an alternative embodiment of a method of fabricating a morphing sandwich structure.

Referring next to FIG. 15, a flow diagram 1500 of an alternative illustrative method of fabricating a morphing sandwich structure is shown. In block 1502, a composite facesheet may be provided. In some embodiments, the composite facesheet may include a laminated construction of reinforcing layers each having a plurality of reinforcing elements and elastomeric matrix layers between the reinforcing layers. In block 1504, a stiffening core may be provided. In some embodiments, the core may include a plurality of core members in an intersecting web configuration. In block 1506, the stiffening core may be attached to the composite facesheet.

Figure 15A:
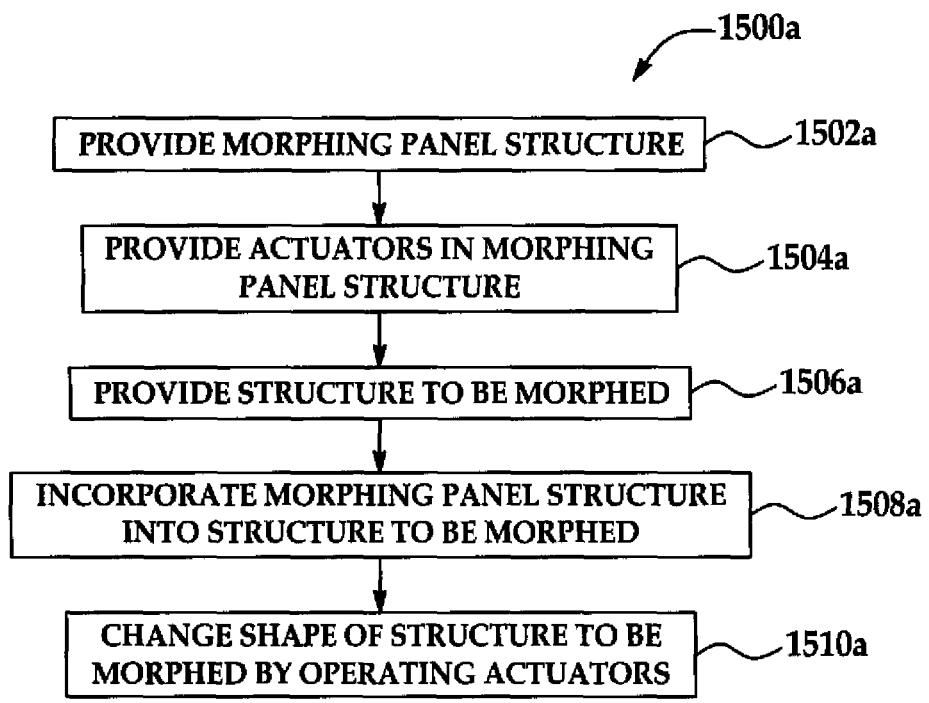
FIG. 15A is an illustration of a flow diagram of a method of changing the shape of a structure.

Referring next to FIG. 15A, a flow diagram 1500a of a method of changing the shape 23 (FIG. 9) of a structure 22 such as a variable span wing, for example and without limitation, is shown. In block 1502a, a morphing panel structure 1 is provided. In block 1504a, actuators 42 are provided in the morphing panel structure 1. In block 1506a, a structure to be morphed 22 such as a variable span wing, for example and without limitation, is provided. In block 1508a, the morphing panel structure 1 is incorporated into the structure 22. In 1510a, the shape of the structure 22 is changed by operating the actuators 42 in the morphing panel structure 1.

Figure 16:
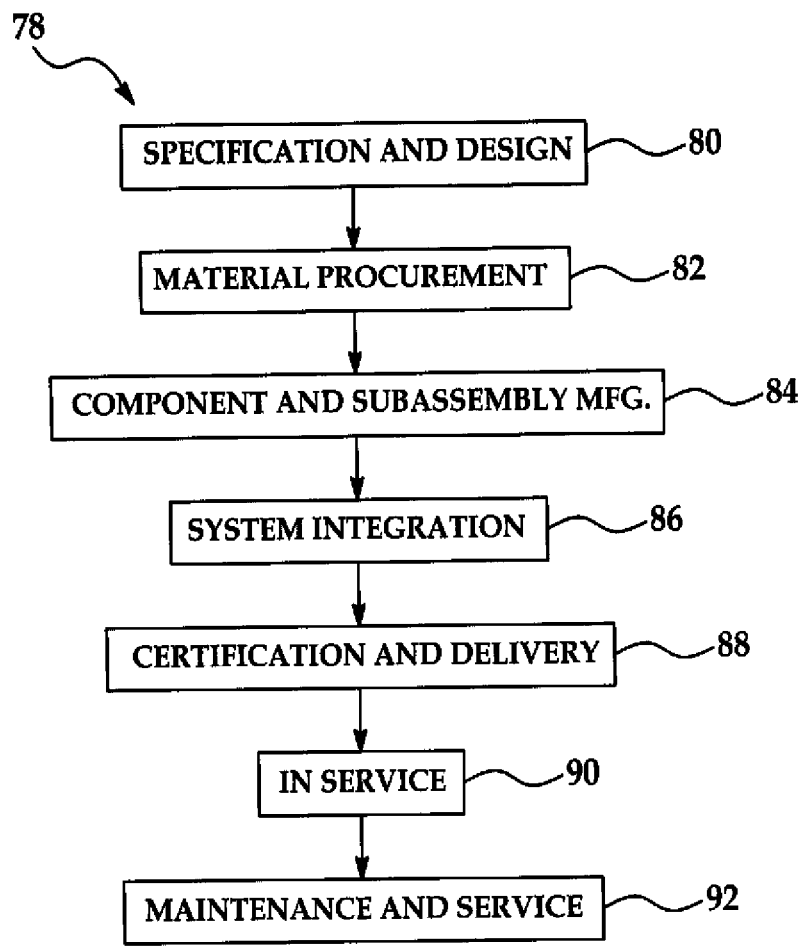
FIG. 16 is an illustration of a flow diagram of an aircraft production and service methodology.
Figure 17:
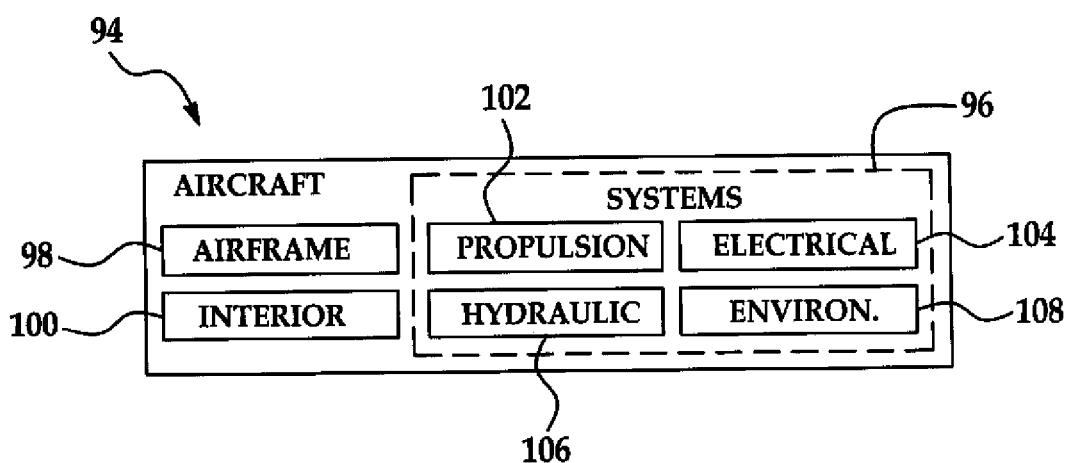
FIG. 17 is an illustration of a block diagram of an aircraft.

Referring next to FIGS. 16 and 17, embodiments of the disclosure may be used in the context of an aircraft manufacturing and service method 78 as shown in FIG. 16 and an aircraft 94 as shown in FIG. 17. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A panel structure, comprising:
a composite facesheet including reinforcing elements defining sheet spaces to enable in-plane deformation of the composite facesheet via in-plane movement of the reinforcing elements and to resist out-of-plane bending deformation wherein said composite facesheet comprises a laminated construction of reinforcing layers each having a plurality of the reinforcing elements and elastomeric matrix layers between said reinforcing layers;
a stiffening core having a plurality of core members in an intersecting web configuration, the stiffening core attached to the composite facesheet to form a skin; and
at least one actuator embedded in the stiffening core.

2. The panel structure of claim 1 wherein the composite facesheet is a first composite facesheet, the skin further comprising a second composite facesheet attached to the stiffening core opposite the first composite facesheet.

3. The panel structure of claim 1 wherein said plurality of reinforcing elements comprises a plurality of rhomboid shaped reinforcing elements or parallelogram shaped reinforcing elements.

4. The panel structure of claim 3 wherein said plurality of reinforcing elements is a plurality of composite reinforcing elements or a plurality of metal reinforcing elements.

5. The panel structure of claim 1 wherein said stiffening core is pliant along x and y axes.

6. The panel structure of claim 1 wherein said web configuration of core members comprises a web configuration of metallic core members.

7. The panel structure of claim 1 wherein said web configuration of core members comprises a web configuration of composite core members.

8. The panel structure of claim 1 further comprising a plurality of openings provided in said core members.

9. The panel structure of claim 1 wherein said at least one actuator is flexible.

10. A panel structure, comprising:
a composite facesheet including:
reinforcing layers each comprising reinforcing elements and core webbing attaching the reinforcing elements to each other; and
elastomeric matrix layers between the reinforcing layers; and
a stiffening core coupled to the composite facesheet to form a skin, the stiffening core including:
a web configuration of intersecting core members defining core spaces between the core members; and
an actuator embedded in the core members.

11. The panel structure of claim 10 further comprising a second composite facesheet coupled to the stiffening core, the second composite facesheet including second reinforcing layers each comprising second reinforcing elements and second core webbing attaching the second reinforcing elements to each other.

12. The panel structure of claim 10 wherein the reinforcing elements comprise parallelogram or rhomboid shaped reinforcing elements.

13. The panel structure of claim 10 wherein the reinforcing elements include composite reinforcing elements or metal reinforcing elements.

14. The panel structure of claim 10 wherein said web configuration of core members comprises a web configuration of composite core members.

15. The panel structure of claim 10 further comprising a plurality of openings formed in said core members.

16. The panel structure of claim 10 wherein the actuator is flexible.

17. The panel structure of claim 10, wherein the stiffening core penetrates a portion of the composite facesheet.

18. An aircraft, comprising:
an airfoil including a panel structure, the panel structure comprising:
a facesheet including a layer having spaced apart plates oriented to move substantially in-plane;
a core coupled to the facesheet to resist out-of-plane bending of the panel structure, the core having porous webbing; and
an actuator embedded in the webbing to deform the core to move the facesheet substantially in-plane.

19. A skin, comprising:
a facesheet including a first layer and a second layer, the first layer having spaced apart plates to move substantially in-plane, the second layer having an elastomeric matrix; and
a core sheet defining pores to receive at least one of a sensor, electronics or an actuator, the core sheet to move in-plane with the facesheet and to resist out-of-plane bending deformation of the skin.

20. A method of fabricating a panel structure, comprising:
providing a composite facesheet including a plurality of reinforcing layers to enable in-plane deformation of the composite facesheet via in-plane movement of the reinforcing elements and to resist out-of-plane deformation;
providing a stiffening core including a plurality of core members in an intersecting web configuration, the core members defining a plurality of core spaces between the core members;
attaching the stiffening core to the composite facesheet to form a skin; and
embedding an actuator in the stiffening core.

21. The method of claim 20, wherein the composite facesheet is a first composite facesheet, and further comprising providing a second composite facesheet and attaching said second composite facesheet to said stiffening core opposite the first composite facesheet.

22. The method of claim 20, wherein embedding the actuator in the stiffening core comprises disposing the actuator in an opening formed in one of the core members.

23. The method of claim 20, wherein attaching the stiffening core to the composite facesheet comprises penetrating the composite facesheet with the stiffening core.

24. A method of changing shape of a structure, comprising:
providing a morphing panel having a facesheet and a core coupled to the facesheet, the facesheet including a first layer of spaced apart reinforcing plates to enable in-plane deformation of the facesheet via in-plane movement of the plates, the core including intersecting walls defining a plurality of spaces between the walls; and
energizing an actuator embedded in the core to deform the morphing panel in-plane to increase a length of the morphing panel and decrease a width of the morphing panel.

* * * * *